United States Patent
Carpenter et al.

(10) Patent No.: US 6,924,770 B2
(45) Date of Patent: Aug. 2, 2005

(54) EXTERNAL MODULAR ANTENNAS AND WIRELESS TERMINALS INCORPORATING THE SAME

(75) Inventors: W. Kevin Carpenter, Durham, NC (US); William Tolbert, Chapel Hill, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 65 days.

(21) Appl. No.: 10/627,928

(22) Filed: Jul. 25, 2003

(65) Prior Publication Data

US 2005/0017909 A1 Jan. 27, 2005

(51) Int. Cl.[7] ................................................ H01Q 1/24
(52) U.S. Cl. .............................. 343/702; 343/700 MS; 343/729
(58) Field of Search ......................... 343/700 MS, 702, 343/725, 729, 900

(56) References Cited

U.S. PATENT DOCUMENTS

| | | |
|---|---|---|
| 5,856,808 A | 1/1999 | Holshouser et al. |
| 5,986,607 A | 11/1999 | Rudisill |
| 6,211,830 B1 * | 4/2001 | Monma et al. ............. 343/702 |
| 6,295,030 B1 * | 9/2001 | Kozakai et al. ...... 343/700 MS |
| 6,380,905 B1 | 4/2002 | Annamaa et al. |
| 6,452,558 B1 * | 9/2002 | Saitou et al. ............... 343/725 |
| 6,538,604 B1 | 3/2003 | Isohätälä et al |
| 6,731,920 B1 * | 5/2004 | Iwai et al. .................. 455/272 |
| 2003/0122726 A1 | 7/2003 | Abbasi et al. .............. 343/846 |

FOREIGN PATENT DOCUMENTS

| | | | |
|---|---|---|---|
| EP | 0833455 A2 | 9/1997 | ........... H04B/1/38 |
| WO | WO01/33664 A1 | 5/2001 | ........... H01Q/1/24 |
| WO | WO02/078123 A1 | 10/2002 | ........... H01Q/1/24 |

OTHER PUBLICATIONS

PCT International Search Report, International Application No. PCT/IB2004/000111 filed Jan. 14, 2004; mailed May 21, 2004.

PCT Written Opinion of the International Searching Authority, May 21, 2004.

* cited by examiner

*Primary Examiner*—Shih-Chao Chen
(74) *Attorney, Agent, or Firm*—Myers Bigel Sibley & Sajovec PA

(57) ABSTRACT

Modular external antenna assemblies are configured to releaseably attach to wireless terminals and replace internal antennas.

29 Claims, 7 Drawing Sheets

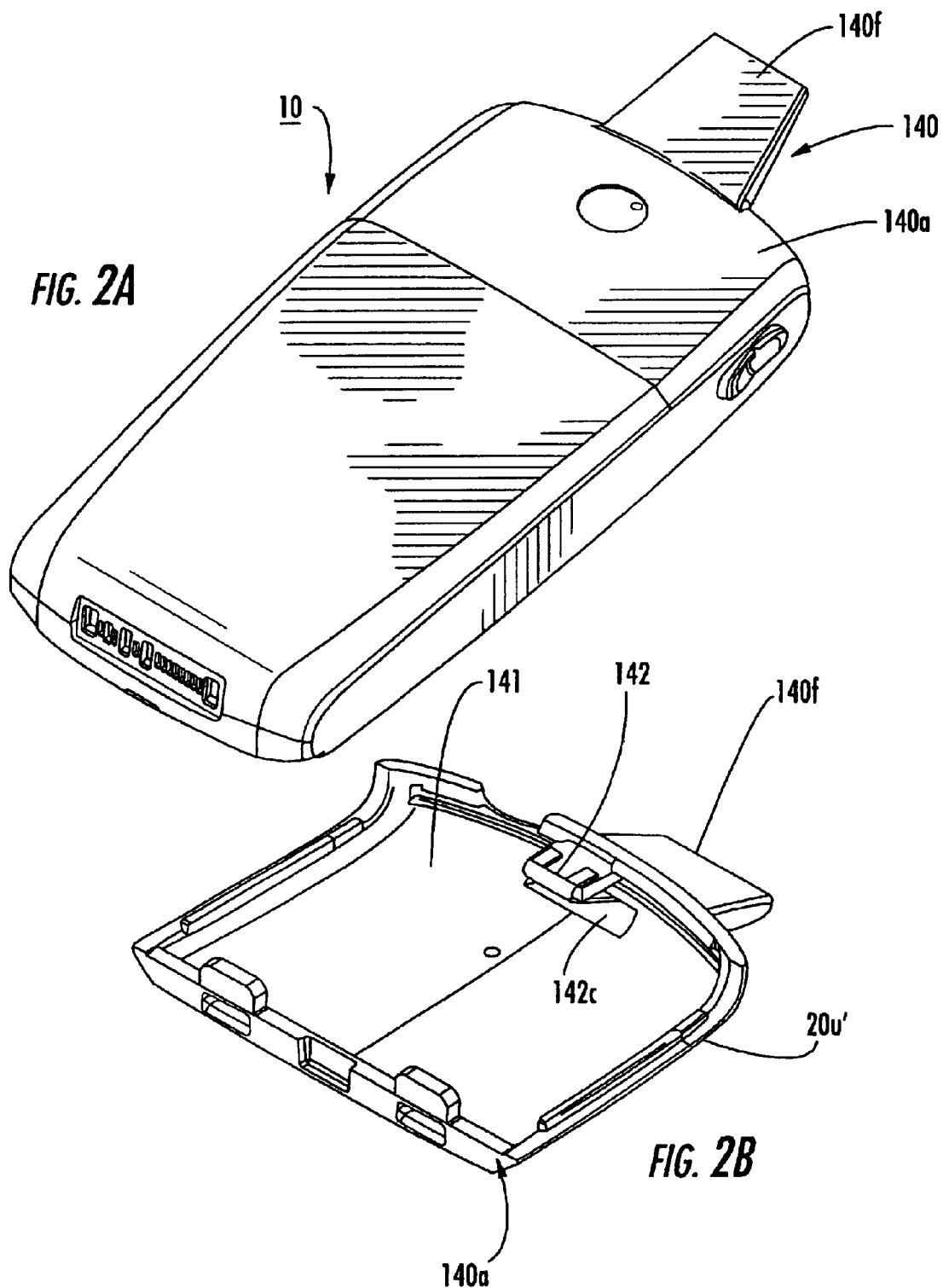

EXTERNAL MODULAR ANTENNAS AND WIRELESS TERMINALS INCORPORATING THE SAME

FIELD OF THE INVENTION

The present invention relates to the field of communications, and, more particularly, to antennas and wireless terminals incorporating the same.

BACKGROUND OF THE INVENTION

The size of wireless terminals has been decreasing with many contemporary wireless terminals being less than 11 centimeters in length. Correspondingly, there is increasing interest in small antennas that can be utilized as internally mounted antennas for wireless terminals. Inverted-F antennas, for example, may be well suited for use within the confines of wireless terminals, particularly wireless terminals undergoing miniaturization. Typically, conventional inverted-F antennas include a conductive element that is maintained in a spaced apart relationship with a ground plane. Exemplary inverted-F antennas are described in U.S. Pat. Nos. 6,538,604 and 6,380,905, which are incorporated herein by reference in their entireties.

Furthermore, it may be desirable for a wireless terminal to operate within multiple frequency bands in order to utilize more than one communications system. For example, Global System for Mobile communication (GSM) is a digital mobile telephone system that typically operates at a low frequency band, such as between 880 MHz and 960 MHz. A Digital Communications System (DCS) is a digital mobile telephone system that typically operates at high frequency bands, such as between 1710 MHz and 1880 MHz. In addition, global positioning systems (GPS) or Bluetooth systems use frequencies of 1.575 or 2.4–2.48 GHz. The frequency bands allocated for mobile terminals in North America include 824–894 MHz for Advanced Mobile Phone Service (AMPS) and 1850–1990 MHz for Personal Communication Services (PCS). Other frequency bands are used in other jurisdictions.

Accordingly, the wireless devices may use antennas configured for operation within multiple frequency bands. Despite the above, certain users may prefer devices with external antennas rather than internal antennas. Accordingly, there remains a need to provide cost-effective alternative antenna configurations that can reflect a user's preference.

SUMMARY OF THE INVENTION

Embodiments of the present invention provide external antennas that can be interchanged, retrofitted, and/or selectively used in place of internal antennas for wireless terminals such as communications devices.

Certain embodiments of the invention are directed toward a modular external antenna assembly that is adapted to replace an internal antenna in a wireless terminal device. The assembly includes a modular antenna housing holding an external antenna and having a shape that is adapted to attach to a predetermined portion of a wireless terminal device that is adapted (in standard operation) to accept, operate with and/or employ an internal antenna.

In particular embodiments, the assembly may include a signal feed positioned in a substantially central top portion of the modular antenna housing so that, in position in the wireless terminal device, the modular external antenna assembly signal feed engages an underlying signal feed of the wireless terminal device that is also configured to electrically connect the internal antenna to the wireless terminal device. The signal feed may be positioned on an inwardly and/or downwardly protruding finger that is sized and configured to automatically connect the modular external antenna to the wireless terminal device signal feed when the modular housing is attached to the wireless terminal device. In certain embodiments, the modular antenna housing is configured to define a portion of a rear cover member of a mobile telephone.

Other embodiments are directed to an after-market internal antenna replacement kit for a wireless terminal device. The kit includes a modular housing with an external antenna held therein. The modular housing is configured and sized to mount to a portion of a predetermined wireless terminal device that is configured to (conventionally) operate with an internal planar inverted F-antenna.

In certain embodiments, the modular antenna housing in the kit can be configured to interchangeably, releaseably attach to the wireless device to replace the rear cover that supports an internal planar inverted F-antenna.

Still other embodiments are directed toward a wireless terminal product. The product includes: (a) a housing having opposing front and back portions, the back portion having a releaseably attachable upper rear panel, the housing configured to enclose a transceiver that transmits and receives wireless communications signals; (b) a ground plane disposed within the housing; (c) a planar inverted-F internal antenna configured and sized to be positioned within the housing and electrically connected with the transceiver, wherein the internal antenna comprises a planar dielectric substrate and a planar conductive element disposed on the planar dielectric substrate, and wherein the internal antenna is integral with a first upper rear panel; (d) an external antenna configured and sized to be positioned within the housing held on a second releaseably attachable upper rear panel member, wherein the first and second upper rear panels with the internal and external antenna, respectively, are configured and sized to be interchangeably attachable to the housing; (e) a signal feed configured to electrically connect to one of the internal and external antennas depending on which of the first and second upper rear panels are in position on the wireless terminal; and (f) a ground feed electrically connected to one of the internal and external antennas depending on which of the first and second upper rear panels are in position on the wireless terminal.

Additional embodiments are directed to methods for retrofitting a wireless device configured to operate with an internal antenna to allow replacement of the internal antenna with an external antenna. The method includes providing a wireless terminal with a housing and an internal antenna and replacing the internal antenna with an external antenna.

In other particular embodiments, the internal antenna (which may be a PIFA antenna) is held on a first rear panel that can be configured to releaseably engage the wireless terminal housing. The external antenna is mounted to a second rear panel that can be configured to releaseably engage the housing. The first and second rear panels can be interchangeably mounted to the wireless housing. The replacing step can be carried out by removing the first panel and then attaching the second panel.

In particular embodiments, the external antenna can be configured to operate at both a high and low frequency band. For example, the external antenna can operate at a first (low band) frequency of between about 824–894 MHz and at least one-second (high band) frequency of between about 1850–1990 MHz.

These and other embodiments will be described further below.

BRIEF DESCRIPTION OF THE DRAWINGS

FIG. 2A is a perspective view of the device of FIG. 1A with an external antenna according to embodiments of the present invention.

FIG. 2B is a perspective view of a rear modular panel that can be configured to hold the external antenna on the device shown in FIG. 2A according to embodiments of the present invention.

DETAILED DESCRIPTION OF EMBODIMENTS OF THE INVENTION

Figure 1A:
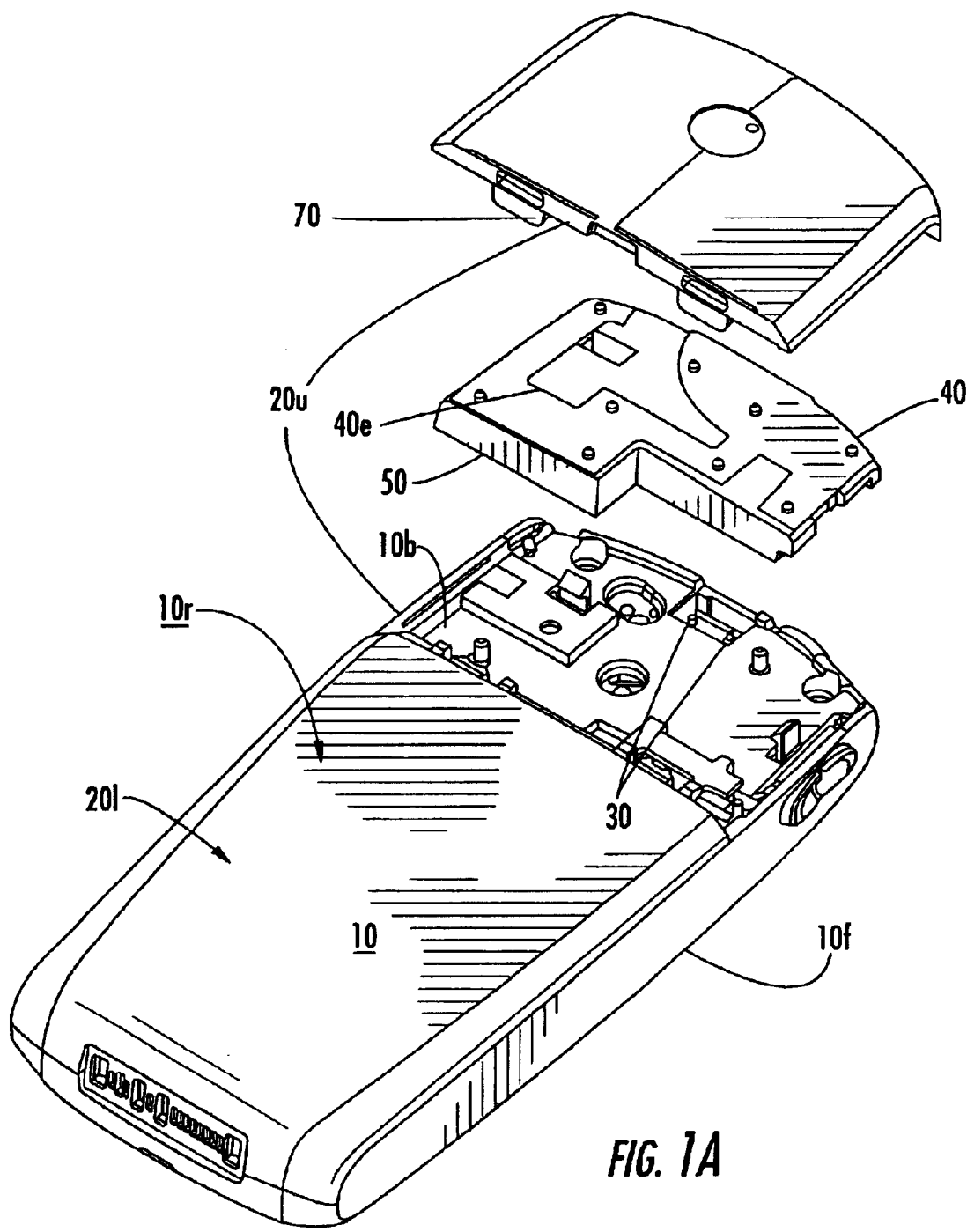
FIG. 1A is an exploded top perspective view of a wireless terminal device with an internal antenna according to embodiments of the present invention.

The present invention will now be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. It will be appreciated that although discussed with respect to a certain antenna embodiment, features or operation of one antenna embodiment can apply to others.

In the drawings, the thickness of lines, layers, features, components and/or regions may be exaggerated for clarity. It will be understood that when a feature, such as a layer, region or substrate, is referred to as being "on" another feature or element, it can be directly on the other element or intervening elements may also be present. In contrast, when an element is referred to as being "directly on" another feature or element, there are no intervening elements present. It will also be understood that, when a feature or element is referred to as being "connected" or "coupled" to another feature or element, it can be directly connected to the other element or intervening elements may be present. In contrast, when a feature or element is referred to as being "directly connected" or "directly coupled" to another element, there are no intervening elements present.

The term "external antenna" means that the antenna is disposed or resides, at least partially, on the outside of the wireless terminal housing or body and is, thus, externally visible to a user. The "external" antenna is in contrast to an "internal" antenna, which is held encased inside the wireless terminal housing or body. The term "modular" means that the external antenna housing component or panel (that can hold and/or support the external antenna and electrical connections) is configured with standardized dimensions that allow the external antenna housing component to interchangeably mount to and replace a predetermined portion of a wireless terminal product that is configured to also accept and/or hold therein an internal antenna, typically an internal planar inverted F-antenna. The modular component can be configured to disengage the internal antenna from operation with the external antenna, thereby providing the active antenna for the device. Typically, the external antenna assembly is configured to allow removal of the internal antenna from the wireless terminal device to thereby replace the internal antenna function. The external antenna can be configured for easy mount (such as "snap-in") replacement of a rear panel and to operate at substantially the same resonant frequencies as the internal antenna to allow substantially transparent operational frequency band integration in the device, when properly installed.

Embodiments of the present invention will now be described in detail below with reference to the figures. Antennas according to embodiments of the present invention may be useful in, for example, multiple mode wireless terminals that support two or more different resonant frequency bands, such as world phones and/or dual mode phones. In certain embodiments, the antennas of the present invention can operate in a low frequency band and a high frequency band. The terms "low frequency band" or "low band" are used interchangeably and, in certain embodiments, include frequencies below about 1 GHz, and typically comprise at least one of 824–894 MHz or 880–960 MHz. The terms "high frequency band" and "high band" are used interchangeably and, in certain embodiments, include frequencies above 1 GHz, and typically frequencies between about 1.5–2.5 GHz. Frequencies in high band can include selected ones or ranges within about 1.700–1.990 GHz, 1.990–2.100 GHz, and/or 2.4–2.485 GHz.

In certain embodiments, the antennas may be configured to provide resonance for a global positioning system (GPS) as the terminal into which this antenna is to be built, and can include a GPS receiver. GPS operates at approximately 1.575 GHz. GPS is well known to those skilled in the art. GPS is a space-based triangulation system using satellites and computers to measure positions anywhere on the earth. Compared to other land-based systems, GPS is less limited in its coverage, typically provides continuous twenty-four hour coverage regardless of weather conditions, and is highly accurate. In the current implementation, a constellation of twenty-four satellites that orbit the earth continually emit the GPS radio frequency. The additional resonance of the antenna as described above permits the antenna to be used to receive these GPS signals.

As used herein, the term "wireless terminal" may include, but is not limited to, a cellular wireless terminal with or without a multi-line display; a Personal Communications System (PCS) terminal that may combine a cellular wireless terminal with data processing, facsimile and data communications capabilities; a PDA that can include a wireless terminal, pager, internet/intranet access, web browser, organizer, calendar and/or a GPS receiver; and a conventional laptop and/or palmtop receiver or other appliance that includes a wireless terminal transceiver. Wireless terminals may also be referred to as "pervasive computing" devices and may be mobile terminals.

It will be understood by those having skill in the art of communications devices that an antenna is a device that may be used for transmitting and/or receiving electrical signals. During transmission, an antenna may accept energy from a transmission line and radiate this energy into space. During reception, an antenna may gather energy from an incident wave and provide this energy to a transmission line. The amount of power radiated from or received by an antenna is typically described in terms of gain.

Voltage Standing Wave Ratio (VSWR) relates to the impedance match of an antenna feed point with a feed line or transmission line of a communications device, such as a wireless terminal. To radiate radio frequency energy with minimum loss, or to pass along received RF energy to a wireless terminal receiver with minimum loss, the impedance of a wireless terminal antenna is conventionally matched to the impedance of a transmission line or feed point. Conventional wireless terminals typically employ an antenna that is electrically connected to a transceiver operatively associated with a signal processing circuit positioned on an internally disposed printed circuit board. In order to increase the power transfer between an antenna and a transceiver, the transceiver and the antenna may be interconnected such that their respective impedances are substantially "matched," i.e., electrically tuned to compensate for undesired antenna impedance components, to provide a 50-Ohm ($\Omega$) (or desired) impedance value at the feed point.

Figure 1B:
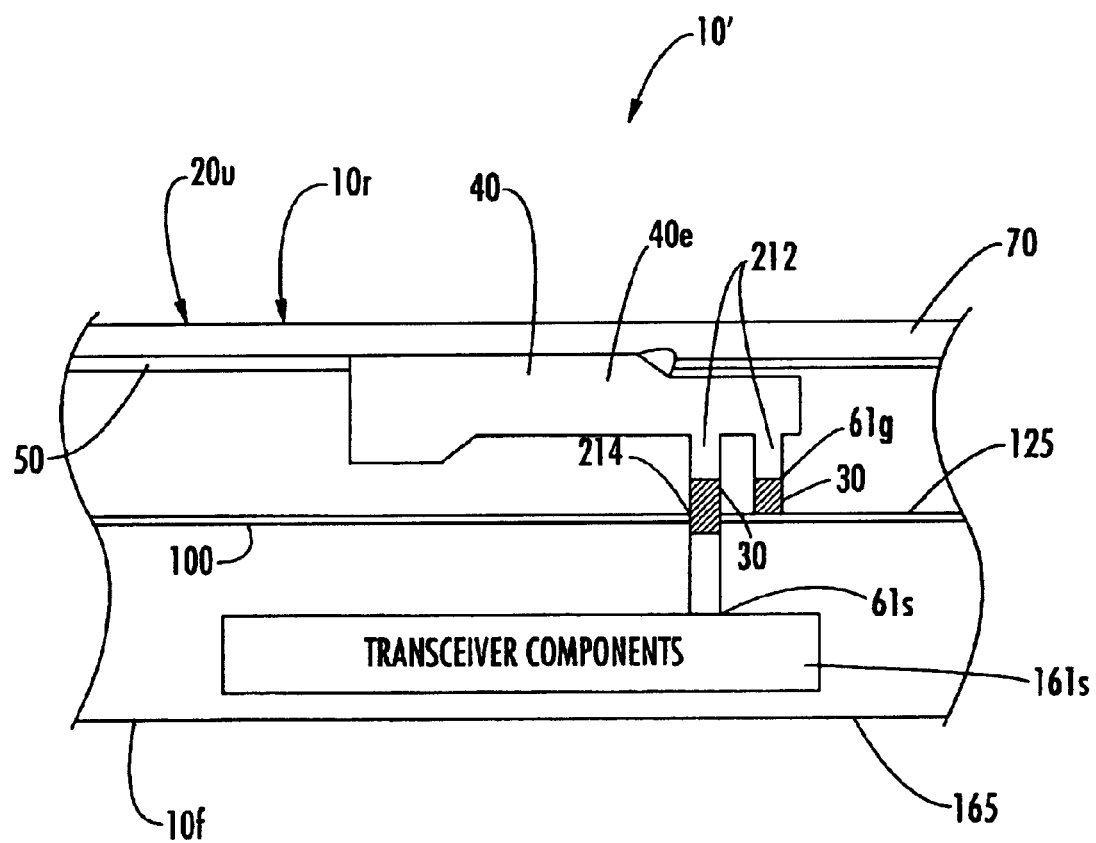
FIG. 1B is a partial side cutaway view of a wireless terminal adapted to hold an internal antenna according to embodiments of the present invention.

Referring to FIGS. 1A and 1B, exemplary conventional devices using internal antennas (typically planar inverted F-antennas) that may be particularly suitable for modular retrofit or upgrade with an external antenna are described. FIG. 1A illustrates the rear portion 10r of an exemplary wireless terminal device 10. The forward portion 10f typically includes a keypad and/or display (not shown). As shown, the device 10 includes a frame body 10b and releaseably attachable upper and lower rear panels, 20u, 20l, respectively, that mount to the frame body 10b. The device 10 can be configured to accept an internal antenna assembly 40 with a conductive element 40e and substrate base 50. In certain embodiments, the lower panel 20l may encase a battery or a battery may actually define the lower rear panel 20l. The upper panel 20u can be an external cover member 70 that is sized and configured to overlie and encase the internal antenna assembly 40 therein. In other embodiments, the upper panel 20u is configured as an integrated cover and antenna assembly, in which the antenna cover 70 and antenna assembly 40 are attached to each other and mount to (and release from) the frame 10b together, typically as a unitary component. An internal surface of the upper rear panel 20u may be used to provide the substrate 50 that holds the antenna 40, such as shown in FIG. 1B.

The device 10 also includes signal and ground connectors 30. The signal and ground connectors 30 may be spring-loaded pins or other mechanical configurations that allow electrical interface between the signal feed (typically via an underlying printed circuit board—shown as feature 100 in FIG. 1B) to the antenna assembly 40. The signal and ground connectors 30 may also be proximately positioned to each other about a substantially central position of a rear top portion of the device 10 to extend outwardly toward the rear 10r of the device. Other configurations may also be used.

The internal antenna 40 can be disposed substantially parallel to a ground plane 125 (FIG. 1B) and can be connected to the ground plane 125 and transceiver components 161s via respective ground and signal feeds. The antenna element 40 may be formed or shaped with a certain size and may reside in a position with respect to the ground plane 125 so as to conform to the shape of the wireless terminal (shown as a radiotelephone terminal housing) or a subassembly therein. For example, the antenna 40 may be placed on a substrate that defines a portion of an enclosed acoustic chamber and/or rear cover or panel 70, 20u as described above. Thus, the internal antenna 40 may be a planar inverted F-antenna, but not be strictly "planar," although in the vernacular of the art, it may still be referred to as a planar inverted-F antenna.

In addition, it will be understood that although the term "ground plane" as used herein, is not limited to the form of a plane. For example, the "ground plane" may be a strip or any shape or reasonable size and may include non-planar structures such as shield cans or other metallic objects.

The antenna conductive element 40e may be provided with or without an underlying substrate dielectric backing, such as, for example, FR4 or polyimide. In addition, the antenna 40 may include air gaps in the spaces between the branches or segments. Alternatively, the spaces may be at least partially filled with a dielectric substrate material or the conductive pattern formed over a backing sheet. Furthermore, an inverted-F conductive element, according to embodiments of the present invention, may have been disposed on and/or within a dielectric substrate (which may be the rear panel 20u and/or cover 70).

The antenna conductive element 40e may be formed of copper and/or other suitable conductive material. For example, the conductive element branches may be formed from a copper sheet. Alternatively, the conductive element branches may be formed from copper layered on a dielectric substrate. However, conductive element branches for inverted-F conductive elements according to the present invention may be formed from various conductive materials and are not limited to copper as is well known to those of skill in the art. The antenna can be fashioned in any suitable manner, including, but not limited to, metal stamping or forming the conductive material in a desired pattern on a flex film or other substrate whether by depositing, inking, painting, etching or otherwise providing conductive material traces onto the substrate material.

Further, as is known to those of skill in the art, matching components may be added to improve the impedance match to a 50-Ohm source and/or to increase bandwidth and low-band gain. For example, adding about 1–3 nH of inductance in series with the feed may improve low-band without significantly influencing high-band.

Referring now to FIG. 1B, a side-sectional view of an exemplary wireless terminal 10' is illustrated. As shown, the internal antenna 40 includes a conductive element 40e that is maintained in spaced apart relationship with a ground plane 125 that is typically held on a printed circuit board 100. The antenna element 40e is in communication with a signal feed 61s and a ground feed 61g via connectors 30.

Referring again to FIG. 1B, a conventional arrangement of electronic components that allow the wireless terminal 10' to transmit and receive wireless terminal communication signals using an internal antenna 40 will be described in further detail. The same operation can occur when the internal antenna 40 is replaced by an external antenna 140, as will be described below. As illustrated, the internal antenna 40 (or external antenna 140 as shown in FIGS. 2–4) for receiving and/or transmitting wireless terminal communication signals is electrically connected to transceiver circuitry components 161s. The components 161s can include a radio-frequency (RF) transceiver that is electrically connected to a controller such as a microprocessor. The controller can be electrically connected to a speaker that is configured to transmit a signal from the controller to a user of a wireless terminal. The controller can also electrically connected to a microphone that receives a voice signal from a user and transmits the voice signal through the controller and transceiver to a remote device. The controller can be electrically connected to a keypad and display that facilitate wireless terminal operation. The design of the transceiver, controller, and microphone are well known to those of skill in the art and need not be described further herein.

The wireless communication device 10, 10' shown in the figures may be a radiotelephone type radio terminal of the cellular or PCS type, which is adapted to selectively allow a user to employ one of an internal antenna 40 and external antenna 140 according to embodiments of the present invention.

As shown in FIG. 1B, the device 10' includes the signal feed 61s that extends from a signal receiver and/or transmitter (e.g., an RF transceiver) comprising electronic transceiver components 161s. The ground plane 125 serves as the ground plane for the planar inverted-F antenna 40. The antenna 40 can include wrapped portions 212, which serve to connect the conductive element 40e to the signal and ground feeds 61s, 61g. The ground feed 61g is connected to the ground plane 125. The antenna 40 can be installed substantially parallel to the ground plane 125, subject to form shapes, distortions and curvatures as might be present for the particular application, as previously discussed. The signal feed 61s can pass through an aperture 214 in the ground plane 125 and is connected to the transceiver components 161s. The transceiver components 161s, the ground plane 125, and the inverted-F antenna 40 can be enclosed in a housing for the wireless (ie., radiotelephone) terminal. The wireless device 10' may include other components such as a keypad and display as noted above. The ground plane 125 may be configured to underlie or overlie the antenna 40.

Turning now to FIGS. 2–4, examples of external antennas 140 held in modular external antenna assemblies 140a that are suitable to replace or be used in a wireless terminal device 10 instead of an internal antenna 40 will be described. Generally stated, the modular external antenna assemblies 140a are configured and sized with predetermined dimensions that allow a respective one to be used with a predetermined wireless terminal 10. In certain embodiments, the external antenna 140 can be configured to provide substantially the same operational resonant frequencies (frequency bands) provided by the internal antenna 40 (typically to provide about quarter-wave and/or half-wave resonance at the desired operational frequencies) so that operation is substantially transparent between the two configurations and performance is not unduly compromised (and may be improved) when using the external antenna 140 instead of the internal antenna 40. The first panel 20u associated with an internal antenna 40 (described above) may be assembled to the device 10 upon original manufacture by an OEM and the second panel 20u' (associated with the external antenna 140) can be provided as an aftermarket component and/or retrofit kit. Alternatively, the second panel 20u' can be provided with or assembled to the device upon original manufacture and the first panel provided as an aftermarket component and/or retrofit kit. Still further, the first and second panels 20u, 20u' may be provided in a kit or package with the device 10 or selectable upon order or purchase to allow a user to employ the particular panel (and associated antenna) he/she prefers. Each antenna 40, 140 can be configured to electrically interface with and/or engage a common signal connection port in the device 10. The external antenna assembly 140a may include matching components or circuits as is well known to those of skill in the art. In certain embodiments, the first and second panels 20u, 20u' are easily interchanged, with the undesired panel antenna being pulled off the device (and, as desired, discarded) and the other panel simply pushed or snapped onto the device to automatically provide the desired electrical interface with the internal circuitry.

FIGS. 2A–2C illustrate a modular antenna assembly 140a with an external antenna 140 this is configured as a "fin" 140f. Examples of conventional fin antennas are well known to those of skill in the art. As shown, the fin antenna 140f may be held substantially centrally and proximate the top of the device body 10b. The modular external antenna assembly 140a is sized and configured to define a second upper rear panel 20u' that can be used interchangeably with a first panel (which may be an OEM installed panel) such as the panel shown as 20u above. The assembly 140 can releaseably mount (typically by frictional engagement and/or snapping into place) in lieu of the first panel 20u associated with the internal antenna 40 (FIG. 1A). The assembly 140a can include an internal cavity 141 and an electrical antenna interface connector 142. The internal cavity 141 may provide an acoustic chamber for a speaker in the device 10. As shown, the antenna interface connector 142 is positioned substantially centrally proximate a top portion of the upper panel 20u' so as to be able to contact an underlying signal connector 30 when the panel 20u' is mounted in position on the body of the device 10. The external antenna 140 can then engage the internal electronics at the same signal feed as the internal antenna 40 described above. The antenna interface connector 142 can be configured as a finger which includes a conductive lower (leaf) spring member 142c that can extend inwardly toward the forward surface of the device 10 and compress to securely contact and engage at least one of the connectors 30. Other interface connectors and/or configurations may be employed as will be well known by those of skill in the art. In addition, the modular external assembly that provides the external antenna may be configured to provide two different external antennas (not shown).

Figures 3A, 3B:
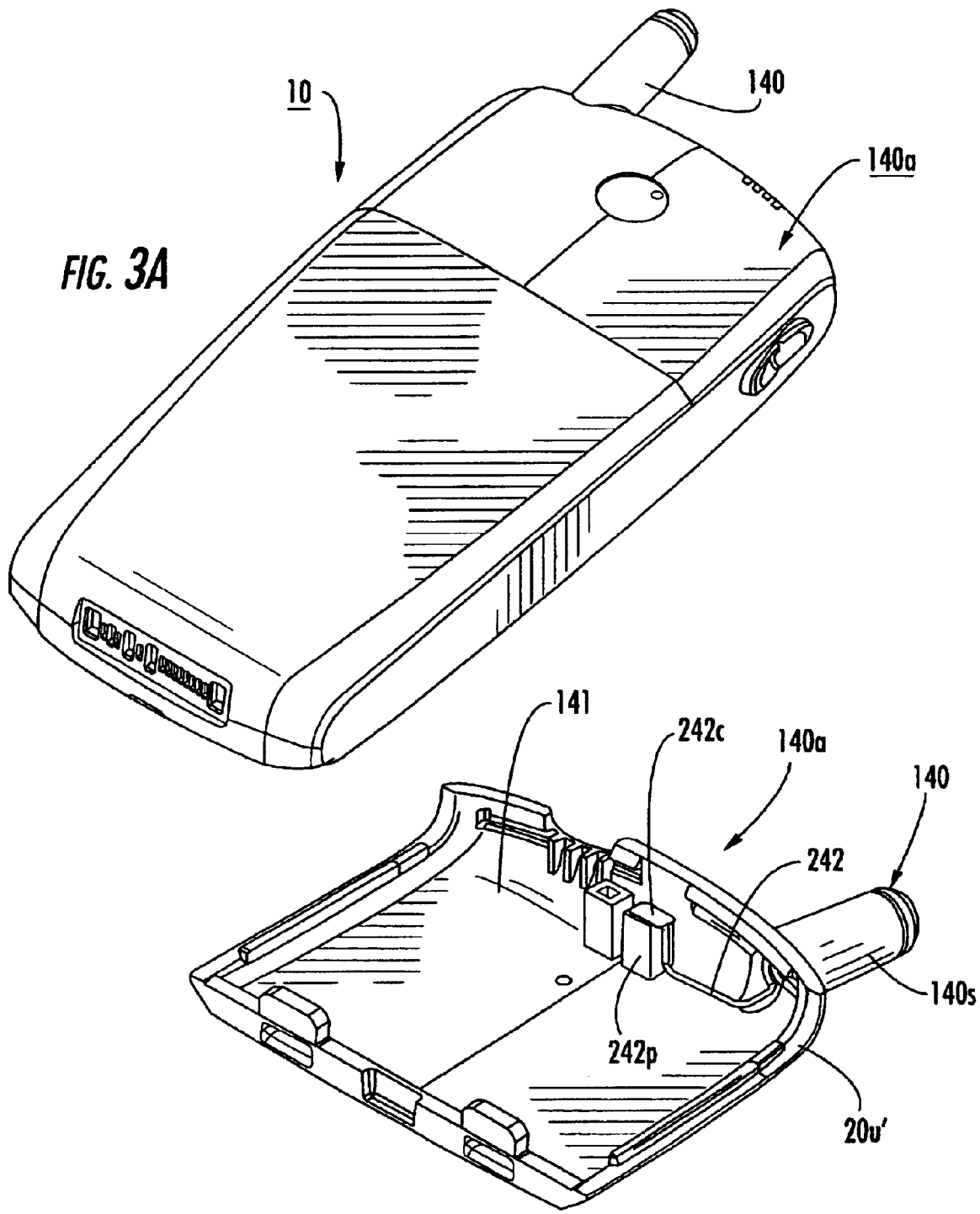
FIG. 3A is a perspective view of the device of FIG. 1A with an external antenna according to additional embodiments of the present invention.
FIGS. 3B and 3C are perspective views of a rear modular panel that can be configured to hold the external antenna on the device shown in FIG. 3A according to embodiments of the present invention.
Figure 3C:
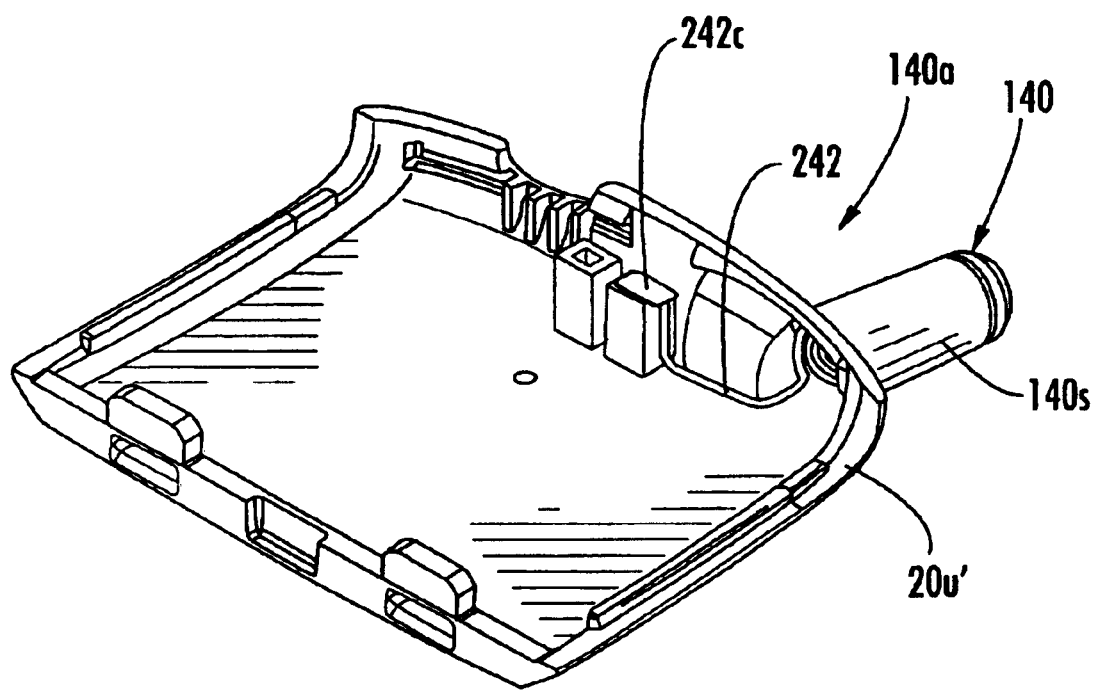

FIGS. 3A–3C illustrate a modular antenna assembly 140a with an external antenna 140 this is configured as a "stub" antenna 140s that is located at a top portion of the panel and is offset from the center thereof. Examples of conventional stub antennas are well known to those of skill in the art. The modular external antenna assembly 140a is sized and configured to define a second upper rear panel 20u' that can be used interchangeably with a first panel 20u. As before, the assembly 140 can releaseably mount (typically frictionally engage or snap into place) in lieu of the first panel 20u associated with the internal antenna 40 (FIG. 1A). The assembly 140a can include an internal cavity 141 and an electrical antenna interface strip 242 that extends between the antenna 140s and the interface contact 242c. The interface contact 242c may be held on a protrusion 242p (such as one or two fingers) that extends inwardly a sufficient distance to engage at least one internal connector 30 when the device 10 is held in operative position. As shown, the antenna interface contact 242c is positioned substantially centrally proximate a top portion of the upper panel 20u' so as to be able to contact an underlying signal connector 30 when the panel 20u' is mounted in position on the body of the device 10. The external antenna 140 can then engage the internal device electronics at the same signal feed as the internal antenna 40 described above. The antenna 140s may comprise a spiral or coiled length of conductive wire that forms the conductive element with the desired load and impedance (such as about ¼ wave or about a ½ wave load).

Figure 4A:
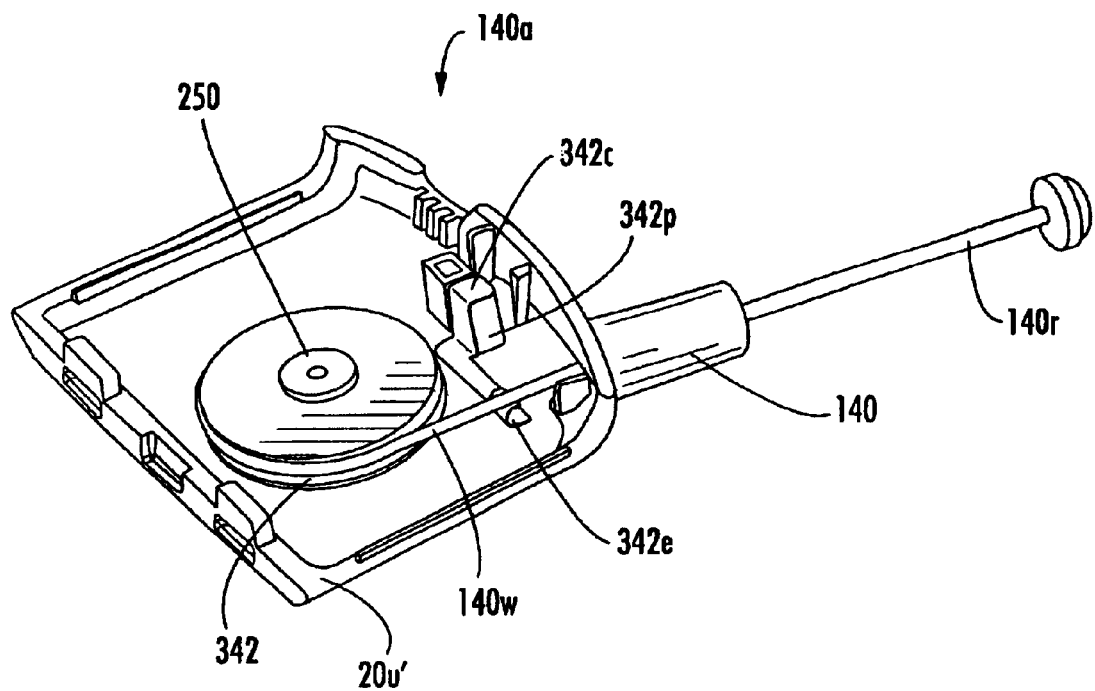
FIG. 4A is a perspective view of a rear modular panel that can be configured to hold an extendable and retractable external antenna (shown in an extended or partially extended state) and that can be mounted to a wireless terminal such as the device shown in FIG. 1A according to embodiments of the present invention.
Figure 4B:
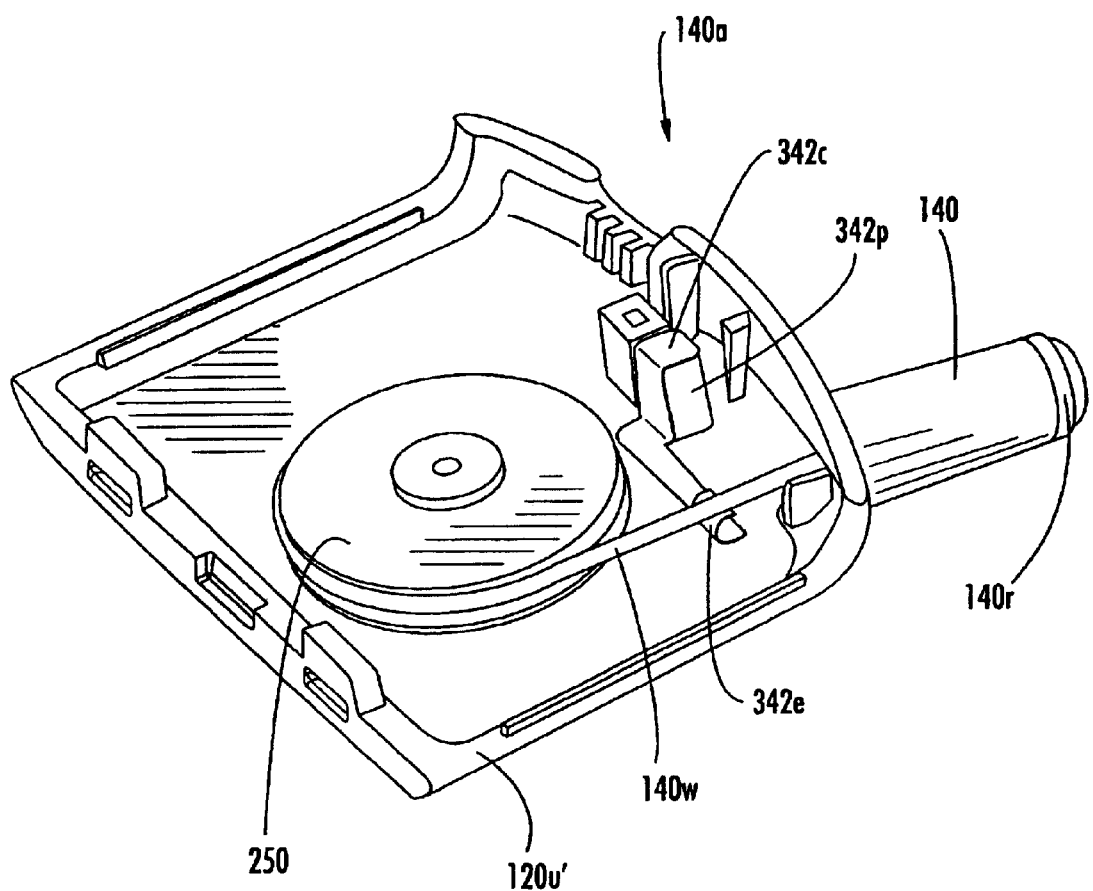
FIG. 4B is a perspective view of the device of FIG. 4A with the external antenna in a retracted state according to embodiments of the present invention.

FIGS. 4A and 4B illustrate an external antenna 140 that is a retractable and extendable antenna 140r. In this embodiment, a take-up reel 250 can be held in the antenna assembly 140a and mounted to the panel 20u' that rotates to wind and unwind a length of conductive rod or wire 140w. FIG. 4A illustrates the antenna rod 140r in an extended position and FIG. 4B illustrates the antenna rod 140r in a retracted position. The rod 140r may be formed of a relatively stiff wire (such as titanium). Other dynamic rod configurations and rod materials may be used.

The electrical interface connection 342 includes a laterally extending strip that contacts the rod 140r on one side and a metal strip 342c that wraps over protrusion 342p on the other side to position the interface contact to engage at least one of the connectors 30 when in position. The antenna rod 140r side of the interface 342 may include a spring-loaded edge portion 342e that is sized and configured to allow the antenna rod 140r to slide there over and still remain in contact with the rod 140r (such as via compression force from the antenna). As noted before, additional switchable matching circuitry can be employed to adjust for the impedance differential provided when the antenna rod 140r is extended rather than retracted. The antenna rod 140r may be configured as a top-loaded whip and may include a top loaded helical coil or other element and a desired linear length of rod as is well known to those of skill in the art.

In certain embodiments, in the extended position (FIG. 4A), the antenna rod 140r may operate with about a half-wave ($\lambda/2$) load. In this situation, the impedance at the output of the antenna feed may rise as high as 600 Ohms. In contrast, in the retracted position, as shown in FIG. 4B, the antenna rod 140r may operate with about a quarter-wave ($\lambda/4$) load with an impedance typically near 50 Ohms. Therefore, when the antenna 140r is in the extended position an L-C matching circuit may be used. The matching circuit (not shown) can be mounted to the rear panel 20u' and electrically positioned in the signal feed path. Exemplary matching circuits are described in U.S. Pat. No. 5,986,607 and U.S. Pat. No. 5,856,808, the contents of which are hereby incorporated by reference as if recited in full herein.

It will be understood that, although antennas according to embodiments of the present invention are described herein with respect to wireless terminals, embodiments of the present invention are not limited to such a configuration. For example, antennas according to embodiments of the present invention may be used within wireless terminals that may only transmit or only receive wireless communications signals. For example, conventional AM/FM radios or any receiver utilizing an antenna may only receive communications signals. Alternatively, remote data input devices may only transmit communications signals.

In the drawings and specification, there have been disclosed embodiments of the invention and, although specific terms are employed, they are used in a generic and descriptive sense only and not for purposes of limitation, the scope of the invention being set forth in the following claims. Thus, the foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses, where used, are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A modular antenna assembly adapted to operationally replace a first internal antenna held in a wireless terminal device, comprising:
a modular antenna housing; and
a second antenna attached to the modular antenna housing,
wherein the modular antenna housing has a shape that is adapted to attach to a predetermined portion of the wireless terminal device, and wherein the modular antenna housing and second antenna are configured to engage the wireless terminal device to cause the wireless terminal device to operate with the second antenna while the first internal antenna remains in position in the wireless terminal device with the second antenna disengaging the internal antenna from operation.

2. A modular external antenna assembly according to claim 1, further comprising a signal feed positioned in a substantially central top portion of the modular antenna housing, wherein, in position in the wireless terminal device, the modular external antenna assembly signal feed engages a signal feed of the wireless terminal device that is also configured to electrically connect the internal antenna to the wireless terminal device.

3. A modular external assembly according to claim 2, wherein the signal feed is positioned on an inwardly and/or downwardly protruding finger that is attached to an inner rear surface of the modular antenna housing, the finger being sized and configured to automatically connect the modular antenna to the wireless terminal device signal feed when the modular housing is attached to the wireless terminal device.

4. A modular external antenna assembly according to claim 1, wherein the modular antenna housing is configured to define a rear panel of the wireless terminal device.

5. A modular external antenna assembly according to claim 1, wherein the modular antenna housing is configured to define a releaseably attachable panel member of a mobile telephone.

6. A modular external antenna assembly according to claim 5, wherein the modular antenna housing defines an upper rear panel of the mobile telephone.

7. A modular external antenna assembly according to claim 1, wherein the second antenna is an external stub antenna that is configured to disengage the internal antenna, and wherein the internal antenna is a planar inverted F-antenna.

8. A modular external antenna assembly according to claim 1, wherein the second antenna is configured as an external fin antenna that is configured to disengage the internal antenna.

9. A modular external antenna assembly according to claim 1, wherein the second antenna is configured as a retractable external antenna that is configured to disengage the internal antenna.

10. A modular external assembly according to claim 1, in combination with the wireless terminal, wherein the second antenna comprises an external antenna is configured to mount to the rear of the wireless terminal device so as to reside over a ground plane therein, the ground plane in the wireless terminal being configured to operatively engage the internal antenna when the second antenna is in position on the wireless terminal device.

11. A modular external antenna assembly according to claim 1, wherein the second antenna comprises an external antenna.

12. A modular antenna according to claim 11, wherein the external antenna is configured to operate at substantially the same resonant frequencies as the internal antenna.

13. An aftermarket antenna kit for operational replacement of an internal antenna for a wireless terminal device, comprising:

a modular housing;

a replacement antenna held by the modular housing, the modular housing configured and sized to mount to a portion of a wireless terminal device while an internal antenna remains substantially in position in the wireless terminal device, the wireless terminal device being configured to operate with the internal antenna when the modular housing is not mounted thereto, and wherein, when mounted, the modular housing is configured to disengage the internal antenna.

14. A kit according to claim 13, wherein the modular housing is configured to define a rear panel of a mobile communications device.

15. A kit according to claim 14, wherein the mobile communications device is a mobile telephone, wherein the second replacement antenna comprises an external antenna, and wherein the internal antenna is an internal planar inverted F-antenna.

16. A kit according to claim 15, wherein the wireless device has a releaseably attachable first rear cover, and wherein the modular antenna housing defines a second rear cover that is configured to interchangeably and releaseably attach to the wireless device so as to replace the first rear cover.

17. A kit according to claim 14, wherein the modular housing comprises signal and ground connectors that reside substantially centrally in a top portion of the modular housing and automatically engage a signal feed in the wireless terminal device when the modular antenna housing is in position on the rear of the wireless terminal device.

18. A kit according to claim 13, wherein the replacement antenna comprises an external antenna.

19. A kit according to claim 18, wherein the external antenna is configured to operate at substantially the same resonant frequencies as the internal antenna.

20. A wireless terminal product, comprising:

(a) a housing having opposing front and back portions, the back portion configured with a cavity and frame that is sized and configured to releaseably serially accept one of a desired interchangeable first or second upper rear panel to enclose the cavity, the housing configured to enclose a transceiver that transmits and receives wireless communications signals;

(b) a ground plane disposed within the housing;

(c) a first planar inverted-F internal antenna configured and sized to be positioned within the housing and electrically connected with the transceiver, wherein the first internal antenna comprises a planar dielectric substrate and a planar conductive element disposed on the planar dielectric substrate;

(d) a second antenna configured and sized to mount to the housing and be held by the second rear panel while the first internal antenna remains in position in the housing; and (e) a signal feed configured to electrically connect to the first internal antenna when the second rear panel with the second antenna is not mounted to the housing and electronically connect to the second antenna when the second rear panel with the second antenna is mounted to the housing via a connector positioned in the cavity of the housing, responsive to whether the second rear panel with the second antenna is in position on the housing, wherein, in position, the second rear panel with the second antenna is configured to disengage the first internal antenna from operation.

21. A wireless terminal product according to claim 20, wherein the wireless terminal product is a mobile communications device; and wherein the device further comprise (f) a ground feed connector disposed in the housing cavity proximate the signal feed connector, electrically connected to only one of the first and second antennas depending on which of the first and second upper rear panels are in position on the housing.

22. A wireless terminal product according to claim 20, wherein the wireless terminal product comprises a wireless mobile telephone.

23. A wireless terminal product according to claim 20, wherein the second antenna comprises an external antenna.

24. A wireless terminal product according to claim 23, wherein the external antenna is configured to operate at substantially the same resonant frequencies as the first internal antenna.

25. A method for retrofitting a wireless device configured to operate with an internal antenna to allow operational replacement of the internal antenna with a replacement antenna:

providing a wireless terminal with a housing and a first internal antenna;

mounting modular antenna assembly that has a predetermined shape and size to the wireless terminal while the first internal antenna remains in the housing, wherein the modular antenna assembly comprises a second antenna; and disengaging replacing the internal antenna from operation responsive to the mounting of the modular antenna assembly so that the wireless terminal operates with the second antenna instead of the first internal antenna.

26. A method according to claim 25, wherein the wireless terminal is configured with interchangeable first and second rear panels with the second rear panel providing the modular antenna assembly with the second antenna, the first and second rear panels being interchangeably mountable to the wireless terminal housing, and wherein the disengaging the first internal antenna is carried out by removing the first panel and then attaching the second panel so that the second antenna becomes active and the first internal antenna becomes inactive in the wireless terminal.

27. A method according to claim 26, wherein the first internal antenna is a planar inverted F-antenna.

28. A method according to claim 25, wherein the second antenna comprises an external antenna.

29. A method according to claim 28, wherein the external antenna is configured to operate at substantially the same resonant frequencies as the internal antenna.

* * * * *

UNITED STATES PATENT AND TRADEMARK OFFICE
CERTIFICATE OF CORRECTION

PATENT NO. : 6,924,770 B2
DATED : August 2, 2005
INVENTOR(S) : Carpenter et al.

It is certified that error appears in the above-identified patent and that said Letters Patent is hereby corrected as shown below:

Column 11,
Line 5, should read -- internal antenna when the second antenna is not in position on --.

Signed and Sealed this

Twenty-seventh Day of December, 2005

JON W. DUDAS
*Director of the United States Patent and Trademark Office*